US006007734A

United States Patent [19]

[11] Patent Number: 6,007,734

[45] Date of Patent: Dec. 28, 1999

Tazaki et al.

[54] DISPERSION COMPOSITION FOR MAGNETIC DISPLAY

[75] Inventors: Hiroshi Tazaki; Akihiro Komatsuzaki; Teruaki Nojima, all of Kanagawa, Japan

[73] Assignee: Kabushiki Kaisha Pilot, Tokyo, Japan

[21] Appl. No.: 08/923,467

[22] Filed: Sep. 4, 1997

[30] Foreign Application Priority Data

Dec. 11, 1996 [JP] Japan .................................... 8-359306

[51] Int. Cl.$^6$ ................................ C09K 3/00; B43L 1/00; G09F 1/00; C09D 5/23

[52] U.S. Cl. .................................... 252/62.54; 252/62.53; 516/22; 516/101; 434/409; 428/900

[58] Field of Search ................................ 252/309, 315.2, 252/62.53, 62.54; 434/409; 260/DIG. 16, DIG. 19, DIG. 20; 516/22, 101; 428/900

[56] References Cited

U.S. PATENT DOCUMENTS

| | | | |
|---|---|---|---|
| 3,380,927 | 4/1968 | Edelstein et al. | 252/308 |
| 4,083,762 | 4/1978 | Krupp et al. | 204/489 |
| 4,143,472 | 3/1979 | Murata et al. | 434/409 |
| 4,536,428 | 8/1985 | Murata et al. | 428/117 |
| 4,643,684 | 2/1987 | Murata et al. | 434/409 |
| 4,678,705 | 7/1987 | Huisman et al. | 428/900 |
| 5,112,229 | 5/1992 | Gilano et al. | 434/409 |
| 5,232,811 | 8/1993 | DeGraft-Johnson et al. | 430/115 |
| 5,641,841 | 6/1997 | Diaz et al. | 525/540 |

FOREIGN PATENT DOCUMENTS

| | | |
|---|---|---|
| 0 010 354 A1 | 4/1980 | European Pat. Off. . |
| 2459522A | 6/1980 | France . |
| 2245868A | 1/1992 | United Kingdom . |

OTHER PUBLICATIONS

Schwartz et al., Surface Active Agents and Detergents, vol. II (Interscience Publishers, Inc, NY, NY copyright 1958) p. 688, 1958.

Patent Abstracts of Japan, vol. 15, No. 275 (C–0849), (Jul. 12, 1991) JP 03–095298 A (Nippon Seiko KK), abstract.

Patent Abstracts of Japan, vol. 13, No. 31 (E–707) (Jan. 24, 1989) JP63–232402A (Nippon Seiko KK), abstract.

*Primary Examiner*—Richard D. Lovering
*Assistant Examiner*—Daniel S. Metzmaier
*Attorney, Agent, or Firm*—Foley & Lardner

[57] ABSTRACT

A dispersion composition suitable for a magnetic display which comprises 10 to 30 wt % of magnetic particles having a particle diameter of 10 to 150 $\mu$m, 0.01 to 0.5 wt % of an antistatic agent, 1 to 10% by weight of an organic thickening agent, 0.1 to 10% by weight of a colorant and a balance of an organic dispersing medium.

10 Claims, No Drawings

DISPERSION COMPOSITION FOR MAGNETIC DISPLAY

BACKGROUND OF THE INVENTION

1. Field of the Invention

The present invention relates to a dispersion composition for a magnetic display which can display and erase a sharp record by magnetism.

2. Description of Related Art

A dispersion composition for a magnetic display is generally known. Such a dispersion composition typically utilizes a magnetic force to cause the migration of magnetic particles and to thereby accomplish a display. Known dispersion compositions generally comprise: magnetic particles, a dispersing medium, a thickening agent, and if necessary, a colorant.

A recording is formed by employing a writing panel including a front substrate containing the dispersion composition and a head or the like provided with a magnetic pen or an electromagnet. In forming the recording, the magnetic particles are attracted by the magnetic force of the magnetic pen or the electromagnet and migrate from a back substrate of the writing panel. A display is formed by the difference between the color of the dispersion and the color of the magnetic powder or particles. In addition, when a magnetic force is produced from the back substrate by a magnetic eraser, the magnetic particles attracted toward the front substrate are pulled toward the back substrate, so that the displayed record can be erased.

In general, a dispersion composition for a magnetic display can be used in a writing plate or the like in which the dispersed magnetic particles are attracted by a magnetic pen to display letters or patterns as they are recorded. For example, the dispersion compositions for magnetic displays have been used in various fields of toys, writing implements and the like. They are usually used under circumstances of daily life at variable temperatures and variable humidity levels rather than under constant environmental conditions.

In conventional dispersion compositions for magnetic displays, a vinyl chloride sheet or a polyester sheet is generally used as the substrate of a display panel as described above. During weather conditions exhibiting low temperatures and dry air, static electricity is easily generated; thus, an electrification phenomenon takes place. Further, under substantially any temperature and humidity condition, when a magnetic pen used with a magnetic display is moved to depict letters or patterns, the front substrate or the back substrate builds up charge due to the generation of the static electricity by the movement of the magnetic particles and collisions between the magnetic particles. Thus, static electricity is also generated by the friction between the magnetic tip of the magnetic pen and the surface of the front substrate, or by the friction between the magnetic eraser and the surface of the back substrate. In addition, when the magnetic pen is held manually, static electricity is also generated by the friction between the surface of the front substrate of the dispersion composition and the operator's hand.

When an electric charge is built up as described above, the magnetic particles become adsorbed on the front substrate or the back substrate, so that the display portion of the panel for magnetic display becomes soiled. Thus, the contrast between written lines and unwritten portions deteriorates. Moreover, when an erasure of written lines is attempted, an erasure defect occurs such that the written lines cannot be completely erased. Furthermore, since the dispersion system of the thickening agent and the colorant is broken down by electrostatic attraction, the magnetic particles sediment and phase separation occurs; thus the durability of the magnetic dispersion composition deteriorates and the sharpness of the letters or the patterns is consequently lost.

In order to solve these problems, various techniques have been suggested. For example, an antistatic agent can be applied onto the surface of the front substrate. Alternately, an antistatic synthetic resin film can be integrally mounted on the surface of the front substrate so that discharging is promptly accomplished through the antistatic synthetic resin film to prevent charge build up when static electricity is generated.

SUMMARY OF THE INVENTION

However, when an antistatic agent is applied to the surface of a front substrate, the magnetic tip rubs the surface of the substrate due to the repetition of display and erasure. Thus, the antistatic agent tends to be easily peeled off by wear, scratches and the like. Consequently, the durability of the antistatic agent cannot be maintained. Furthermore, when an antistatic synthetic resin film is mounted on the surface of the front substrate, additional problems arise such as:

(1) the sharpness letters and patterns on the written display deteriorate due to the presence of the antistatic synthetic resin film, and (2) an additional step of mounting the film on the surface of the front substrate is required, thereby increasing manufacturing costs.

In view of such circumstances, the present invention has been developed. An object of the present invention is to provide a dispersion composition suitable for a magnetic display which can prevent influence by static electricity. Another object of the present invention is to provide a dispersion composition for a magnetic display wherein the contrast between written lines and unwritten portions does not substantially deteriorate even under severe conditions, such as in winter when static electricity is easily generated. It is yet a further object to substantially prevent defects such as an insufficient erasure of the written lines, while obtaining sharp written lines and good shielding properties of the unwritten portions, and while not adversely affecting manufacturing costs.

In accordance with these and other objects, there is provided a dispersion composition suitable for a magnetic display comprising:

10 to 30 wt % of magnetic particles having a particle diameter of 10 to 150 $\mu$m, 0.01 to 0.5 wt % of an antistatic agent, 1 to 10% by weight of an organic thickening agent, 0.1 to 10% by weight of a colorant and a balance of an organic dispersing medium.

DETAILED DESCRIPTION OF PREFERRED EMBODIMENTS

A dispersion composition suitable for a magnetic display of the present invention can be obtained for example, by mixing magnetic particles, a dispersing medium, a thickening agent, an antistatic agent, and if necessary, a colorant.

The antistatic agent which can be used in the present invention includes, inter alia, composite types, anionic types, cationic types, nonionic types and/or a polymeric types of antistatic agents.

Examples of suitable anionic type antistatic agents include alkylbenzenesulfonic acids, alkyl benzenesulfonates, alkyl phosphates, sodium dialkylsulfosuccinate, calcium sulfosuccinate, chromium salts of salicylic acid and aluminum salts of salicylic acid; examples of suitable cationic type antistatic agents include aliphatic alkyl quaternary ammonium salts; examples of suitable nonionic type antistatic agents include polyoxyethylene alkyl ether, polyoxyethylene alkylallyl ether, polyalkylene oxide derivatives such as polyoxyethylenealkylamines and sorbitan fatty acid esters; and examples of suitable polymeric type antistatic agents include amine salts of polycarboxylic acids and aminoethanol•epichlorohydrin polycondensates. Examples of other suitable antistatic agents include alkylbetaines, sulfobetaines and sulfonated polybutenes. An example of the composite type is a combination of two or more selected from the above-mentioned examples. These antistatic agents can be used singly or in a combination of two or more thereof, preferably in an amount of 0.01 to 0.5 wt % based on the weight of the dispersion.

Examples of suitable magnetic particles include magnetic oxide materials such as black magnetite, γ-hematite, chromium dioxide and ferrite, and magnetic metal materials comprising alloys of cobalt, nickel and the like. Such magnetic particles can preferably be used in an amount of 10 to 30 wt % based on the dispersion, for example, in the form of a powder or flakes. In order to regulate the size, shape, etc., of the magnetic particles, optionally, granules may be formed. The size of the magnetic particles which can be used in the present invention preferably ranges from a fine powder to coarse grains and the size can be selected to comply with the ultimate end use and/or purpose. The shape of the magnetic particles may comprise one or more of spheres, columns, masses, flakes or the like. The magnetic particles may be mixed with one or more colorants, or may be coated with a colorant.

The size of the magnetic particles should preferably be uniform so that a sharp display can be obtained. This is because if the sizes of the magnetic particles are uneven, the migration of the magnetic particles may also be uneven.

In order to maintain the retention properties of the display, and the sharpness and erasability of the magnetic panel, it is desirable that the thickening agent be blended. The thickening agent is preferably present in an amount in the range of 1 to 10 wt %.

Examples of suitable organic thickening agents include fatty acid bisamides having a hydroxyl group such as ethylenebis-12-hydroxystearic acid amide, hydrogenated castor oil and N-acylamino acid alkyl amides such as N-lauroyl-L-glutamic acid-a,γ-di-n-butylamide. These organic thickening agents can be used singly or in a combination of two or more thereof in the dispersion. Alternatively, the thickening agent may be combined with another organic thickening agent or with an inorganic thickening agent as an auxiliary thickening agent.

Examples of suitable dispersing mediums include oils, non-polar solvents such as aliphatic hydrocarbons, and polar solvents such as glycols and alcohols, but aliphatic hydrocarbons such as isoparaffins are preferable.

Typical examples of suitable dispersing mediums also include isoparaffins, spindle oils and ethylene glycol.

Examples of suitable colorants include white pigments, and other dyes and pigments. The amount of the colorant is preferably 10% or less, most preferably 3% or less based the weight of the dispersion. The use of the above-mentioned amount of the colorant can heighten the contrast between the dispersion and the magnetic particles, so that the sharpness of the display is increased. If the amount of the colorant is too great, the display may possibly be unclear.

If an antistatic agent which is poor in dispersibility is employed, such as a chromium salt of salicylic acid or the like, the antistatic agent can first be dissolved in a solvent such as toluene, which is compatible with the dispersing medium. The antistatic agent can then be added to the dispersing medium so that a favorable dispersion state can be obtained. In addition, even antistatic agents which are soluble with the dispersing medium can be first dissolved in a suitable solvent before use if desired.

The dispersion composition suitable for a magnetic display of the present invention is preferably contained in a multi-cell panel or in capsules, and then used for the display. Exemplary methods for forming a suitable panel are described below.

A suitable panel for a magnetic display can be prepared by forming a small chamber having a multi-cell structure on a substrate, filling this chamber with the dispersion composition, and then sticking another substrate on the dispersion.

Alternatively, small chambers defined by many concavities formed on a substrate can be filled with the dispersion composition, and another substrate can be then stuck thereon. Furthermore, concavities may be formed on either or both of the substrates, and these substrates may be joined to each other to define independent small chambers between the substrates.

In addition, the dispersion composition can be contained in capsules, and these capsules can be mixed with a binder material, applied on substrates, and then dried to prepare the display panel.

EXAMPLES

Example 1

0.1 part by weight of an antistatic agent (STADIS 425, made by Du Pont) and 1.3 parts by weight of hydrogenated castor oil (THIXCIN R, Rheox, Inc.) were added to 85.2 parts by weight of an isoparaffin solvent (ISOPER M, made by Esso Chemical Co., Ltd.), and the mixture was then heated to dissolve them, and then cooled to obtain a dispersion.

Afterward, 86.6 parts by weight of this dispersion was mixed with and dispersed in 1.1 parts by weight of titanium oxide (TIPAQUE CR-50, made by Ishihara Sangyo Co., Ltd.) by a wet dispersing machine (T.K. HOMOMIXER, made by Tokushu Kika Kogyo Co., Ltd.) to obtain 87.7 parts by weight of a white dispersion.

Next, a magnetite (TODA COLOR KN-320, made by Toda Kogyo Ltd.) 80 parts by weight and a 40% methyl ethyl ketone solution of a solid epoxy resin (EPOTOHTO YD-017, made by Tohto Kasei Co., Ltd.) 50 parts by weight were kneaded with each other, and the mixture was dried, and then ground to obtain 50 parts by weight of black magnetic particles of 10 to 150 $\mu$m.

Afterward, 12.3 parts by weight of the magnetic particles was mixed with 87.7 parts by weight of the above-mentioned white dispersion to obtain 100 parts by weight of the dispersion composition for magnetic display.

Examples 2 to 10

The same procedure as in Example 1 was repeated except that blends shown in Table 1 were used, thereby obtaining dispersion compositions for a magnetic display.

Example 11

The same procedure as in Example 1 was repeated except that a blend shown in Table 1 was used, thereby obtaining a dispersion composition for a magnetic display of Example 11.

Comparative Example 1

1.3 parts by weight of ethylenebis-12-hydroxystearic acid amide (ITOH WAX J-530, made by Itoh Seiyu Co., Ltd.) was added to 85.2 parts by weight of an isoparaffin solvent (ISOPER M, made by Esso Chemical Co., Ltd.), and the mixture was then heated to dissolve them, and then cooled to obtain a dispersion.

Afterward, 86.5 parts by weight of this dispersion was mixed with and dispersed in 1.3 parts by weight of titanium oxide (TIPAQUE CR-50, made by Ishihara Sangyo Co., Ltd.) by T.K. HOMOMIXER (a wet dispersing machine, made by Tokushu Kika Kogyo Co., Ltd.) to obtain 87.7 parts by weight of a white dispersion.

Next, a magnetite (TODA COLOR KN-320, made by Toda Kogyo Co., Ltd.) 80 parts by weight and a 40% methyl ethyl ketone solution of a solid epoxy resin (EPOTOHTO YD-017, made by Tohto Kasei Co., Ltd.) 50 parts by weight were kneaded with each other, and the mixture was dried, and then ground to obtain 50 parts by weight of black magnetic particles of 10 to 150 μm.

Afterward, 12.3 parts by weight of the magnetic particles was mixed with 87.7 parts by weight of the above-mentioned white dispersion to obtain 100 parts by weight of the dispersion composition for a magnetic display.

Comparative Examples 2 and 3

The same procedure as in Example 1 was repeated except that blends shown in Table 1 were used, thereby obtaining dispersion compositions for a magnetic display.

USE EXAMPLES

Use Example 1

In the first place, a multi-cell plate of a honeycomb structure, which was formed from a vinyl chloride sheet having a thickness of about 0.065 mm and which had a substantially equilateral hexagon with one side of about 2 mm and a height of about 0.8 mm, was stuck on a vinyl chloride sheet having a thickness of about 0.15 mm as a transparent front substrate by the use of an ethylene-vinyl acetate adhesive, thereby obtaining a display panel member. Next, the respective small chambers of the multi-cell structure were filled with a dispersion composition for magnetic display of Example 1, and then sealed with a vinyl chloride sheet having a thickness of about 0.08 mm as a transparent back substrate by the use of an epoxy adhesive to prepare a panel for a magnetic display (a morphology A).

Use Examples 2 to 10

The same procedure as in Use Example 1 was repeated, thereby preparing panels 2 to 10 for magnetic display of the morphology A filled with dispersion compositions for a magnetic display of Examples 2 to 10.

Use Example 11

In the first place, a vinyl chloride sheet having a thickness of about 0.15 mm as a transparent back substrate and having a substantially equilateral hexagon with one side of about 2 mm and many continuous concavities of about 0.8 mm in depth was formed by the use of a vacuum molding machine. Next, the respective concavities were filled with a dispersion composition for a magnetic display of Example 11, and then sealed with a transparent vinyl chloride sheet having a thickness of about 0.08 mm as a front substrate by the use of an epoxy adhesive to prepare a panel for a magnetic display (a morphology B).

Use Example 1 of Comparative Example I

Filling was made with a dispersion composition for magnetic display of Comparative Example 1 by the same procedure as in Use Example 1 to prepare a panel for a magnetic display of a morphology A.

Use Examples 2 and 3 of Comparative Examples 2 and 3

Filling was made with each of dispersion compositions for magnetic display of Comparative Examples 2 and 3 by the same procedure as in Use Example 11 to prepare panels for a magnetic display of a morphology B.

TABLE 1

| | | | Example | | | | | | | | | | | Comp. Example | | |
|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 |
| Blend | Antistatic agent | L | 0.1 | | | | | | | | | | | | | |
| | | M | | 0.1 | | | | | | | | | | | | |
| | | N | | | 0.1 | | | | | | | | | | | |
| | | O | | | | 0.1 | | | | | | | | | | |
| | | P | | | | | 0.1 | | | | | | | | | |
| | | Q | | | | | | 0.1 | | | | | | | | |
| | | R | | | | | | | 0.1 | | | | | | | |
| | | S | | | | | | | | 0.1 | | | | | | |
| | | T | | | | | | | | | 0.1 | | | | | |
| | | U | | | | | | | | | | 0.1 | | | | |
| | | V | | | | | | | | | | | 0.1 | | | |
| | Thickening agent | Ethylenebis-12-hydroxystearic acid amide | | | 1.3 | 1.3 | 1.3 | 1.3 | 1.3 | 1.3 | 1.3 | 1.3 | 1.3 | 1.3 | | |
| | | Hydrogenated castor oil | 1.3 | | | | | | | | | | | | | 1.3 |
| | | N-acylamino acid alkyl amide | | 1.3 | | | | | | | | | | | 1.3 | |
| | Dispersing medium | Isoparaffin solvent | 85.2 | 85.2 | | | 84.4 | 85.2 | 84.4 | 85.2 | 85.2 | 85.2 | 85.2 | 85.2 | | |
| | | Spindle oil | | | | 84.4 | | | | | | | | | | 85.2 |

TABLE 1-continued

| | | Example | | | | | | | | | | | Comp. Example | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| | Ethylene glycol | | | 85.2 | | | | | | | | | | 85.2 | |
| | Toluene | | | | 0.8 | 0.8 | | 0.8 | | | | | | | |
| Magnetic particle | Magnetite | 12.3 | 12.3 | 12.3 | 12.3 | 12.3 | 12.3 | 12.3 | 12.3 | 12.3 | 12.3 | 12.3 | 12.3 | 12.3 | 12.3 |
| Colorant | Titanium oxide | 1.1 | 1.1 | 1.1 | 1.1 | 1.1 | 1.1 | 1.1 | 1.1 | 1.1 | 1.1 | 1.1 | 1.2 | 1.2 | 1.1 |
| Morphology of panel | | A | A | A | A | A | A | A | A | A | A | B | A | B | B |

NOTES

L: Four components (a sulfonated polybutene, an aliphatic alkyl quaternary ammonium salt, an aminoethanol-epichlorohydrin polycondensate and an alkylbenzene-sulfonic acid) (E.I. du Pont de Nemours & Co., Inc., registered trademark STADIS-425)

M: Four components (a sulfonated polybutene, an aliphatic alkyl quaternary ammonium salt, an aminoethanol-epichlorohydrin polycondensate and an alkylbenzene-sulfonic acid) (E.I. du Pont de Nemours & Co., Inc., registered trademark STADIS-450)

N: Three components (a chromium salt of alkylsalicylic acid, calcium sulfosuccinate and a polymer) (Shell Petrochemical Co., Inc., registered trademark ASA-3)

O: A chromium salt of salicylic acid (orient Chemical Industry Co., Ltd., registered trademark BONTRON E-84)

P: An aluminum salt of salicylic acid (Orient Chemical Industry Co., Ltd., registered trademark BONTRON E-88)

Q: sodium dialkylsulfosuccinate (Nippon Nyuukazai Co., Ltd., registered trademark NEWCALL 291PG)

R: Sodium dodecylbenzenesulfonate (Tokyo Kasei Industrial Co., Ltd., registered trademark FAW01)

S: Stearyltrimethylammonium chloride (Kao Co.,

Ltd., registered trademark COATAMIN 86P CONC)

T: Sorbitan monolaurate (Nippon Nyuukazai Co., Ltd., registered trademark TECHSNOL SPT)

U: Polycarboxylic acid type high-molecular activator (Kao Co., Ltd., registered trademark HOMOGENOL L-18)

V: Polycarboxylic acid type high-molecular activator (Kao Co., Ltd., registered trademark HOMOGENOL L-1820).

TEST PROCEDURE AND EVALUATION

To elucidate the effects of the present invention, the dispersion compositions for a magnetic display in the use examples in which the panels for magnetic display of the examples and the comparative examples were used were tested to inspect the following items, and evaluation was then made.

(1) Durability (life of dispersion)

A magnetic panel was attached to a disc tester, and writing and erasure were continuously repeated to inspect an occurrence number of a change state (the sedimentation of magnetic particles and the phase separation of the dispersion) of the magnetic panel.

Here, the disc tester will be described. The disc tester comprises a disc plate portion to which the panel for magnetic display is attached, a driving portion for rotating it, writing magnets and erasure magnets. The plate portion is an aluminum disc having a thickness of 1.5 mm and a diameter of 200 mm, and in the driving portion, a small motor (21J3GA-A2, made by Oriental Motor Co., Ltd.) which can control a rotational frequency and a speed is used, and a central portion of the plate portion is mounted on its shaft. As the writing magnets, five columnar magnets having a diameter of 1 mm are arranged every 72° on the periphery of the plate and at positions which are radially separated 65 mm from the center of the plate portion and in which the magnets come in contact with the surface of a front substrate of the panel for magnetic display when the panel for the magnetic display is attached to the plate portion. Furthermore, as the erasure magnets, five magnets are arranged every 72° on a back surface of the plate portion, the phase of the erasure magnets being deviated from that of the writing magnets.

The test was accomplished by first attaching the panel for magnetic display to the plate portion, rotating the panel for magnetic display at a speed of 10 rpm, doing a record (a writing speed=4 m/min) by heads of electromagnets of the writing magnets, erasing the record by the erasure magnets arranged on the back surface of the plate, the phase being deviated, continuously repeating this operation so that the writing and the erasure might be carried out 50 times per minute. In this connection, as the erasure magnets, anisotropic rubber magnets (NT-5M-1504, made by Mag-X Co., Ltd., length 10 mm×height 10 mm×thickness 5 mm) in which one surface was magnetic were used.

(2) Antistatic properties (influence by the generation of static electricity)

The surface of the magnetic panel was charged by the use of a static electricity obstacle tester (SET-30A model, Sanki Electronic Industry Co., Ltd.), and a voltage at a time when magnetic particles were deposited on the front surface was measured.

(3) Sharpness (contrast)

When static electricity was generated in the magnetic panel (at the application of a voltage of 3 KV), writing was accomplished by the use of a magnetic pen, and at this time, whiteness degrees of a written line and an unwritten portion (the surface of the display) were measured by a Macbeth densitometer (RD-915 model) to determine a difference between O.D. values of the written line and the unwritten portion. In this connection, for the writing, a permanent magnet (size=2×2×3 mm direction) corresponding to JIS C2502 MPB380 was used as a writing tip.

The evaluation results of the respective tests are shown in Table 2.

TABLE 2

| | Durability (times) | Antistatic Properties (KV) | Sharpness | Total |
|---|---|---|---|---|
| Example 1 | 30,000 | 4.0 | 0.75 | O |
| Example 2 | 30,000 | 4.5 | 0.75 | O |

TABLE 2-continued

| | Durability (times) | Antistatic Properties (KV) | Sharpness | Total |
|---|---|---|---|---|
| Example 3 | 32,500 | 6.5 | 0.75 | O |
| Example 4 | 30,000 | 3.5 | 0.75 | O |
| Example 5 | 27,500 | 4.0 | 0.75 | O |
| Example 6 | 30,000 | 4.0 | 0.75 | O |
| Example 7 | 20,000 | 4.0 | 0.75 | O |
| Example 8 | 30,000 | 3.5 | 0.75 | O |
| Example 9 | 27,500 | 4.0 | 0.75 | O |
| Example 10 | 32,500 | 3.5 | 0.75 | O |
| Example 11 | 25,000 | 4.0 | 0.75 | O |
| Comp. Ex. 1 | 15,000 | 2.5 | 0.57 | X |
| Comp. Ex. 2 | 15,000 | 2.5 | 0.57 | X |
| Comp. Ex. 3 | 15,000 | 2.5 | 0.57 | X |

Meritorious Effects of the Invention

As described above, according to the present invention, durability, antistatic properties and sharpness do not deteriorate even when static electricity is generated by the movement of magnetic particles, the collision between the magnetic particles or the friction between a magnetic pen and the surface of a front substrate in the case that the display and erasure of letters and patterns are repeated, or by the change of circumstances of temperature, humidity and the like. That is to say, there can be obtained an effect that a record can always be displayed sharply by a high contrast, and an effect that the erasure of the record can clearly be accomplished.

What is claimed is:

1. A dispersion composition suitable for a magnetic display comprising:

(a) 10 to 30 wt % of magnetic particles having a particle diameter of 10 to 150 $\mu$m;

(b) 0.01 to 0.5 wt % of an antistatic agents;

(c) 1 to 10% by weight of an organic thickening agent;

(d) 0.1 to 10% by weight of a colorant; and (e) a balance of an organic dispersing medium;

wherein said antistatic agent is either:

(i) a mixture of sulfonated polybutenes, aliphatic alkyl quaternary ammonium salts, aminoethanol•epichlorohydrin polycondensates and allylbenzene sulphonic acids; or (ii) a mixture of chromium salts of alkylsalicylic acids, calcium salt of sulfosuccinic acid and a polymer.

2. A dispersion composition suitable for a magnetic display according to claim 1, wherein the organic dispersing medium is an isoparaffin, a spindle oil or ethylene glycol.

3. A dispersion composition suitable for a magnetic display according to claim 1, wherein the organic dispersing medium is a mixture of an isoparaffin and a spindle oil.

4. A dispersion composition suitable for a magnetic display according to claim 1, further comprising a solvent in which the antistatic agent is dissolved and/or dispersed, and wherein said solvent is compatible with said organic dispersing agent.

5. A dispersion composition suitable for a magnetic display according to claim 1, wherein the thickening agent is one or more selected from the group consisting of fatty acid bisamides, hydrogenated castor oil and N-acylamino acid alkyl amides having a hydroxyl group.

6. A dispersion composition suitable for a magnetic display according to claim 1, wherein said organic thickening agent functions to maintain the retention properties of said magnetic display.

7. A dispersion composition suitable for a magnetic display according to claim 1, wherein said organic dispersing medium functions to maintain components of the composition in a dispersion state.

8. A dispersion composition suitable for a magnetic display according to claim 1, wherein said colorant is a dye or pigment.

9. A dispersion composition suitable for a magnetic display according to claim 1, wherein none of said components a, b, c, d, and e are the same.

10. A dispersion composition suitable for a magnetic display comprising:

(a) 10 to 30 wt % of magnetic particles having a particle diameter of 10 to 150 $\mu$m;

(b) 0.01 to 0.5 wt % of an antistatic agent;

(c) 1 to 10% by weight of organic thickening agent that maintains the retention/properties of said magnetic display;

(d) 0.1 to 10% by a colorant comprising a dye or pigment; and (e) a balance of an orgnic dispersing medium that maintains components of the composition in a dispersion state;

wherein said antistatic agent is either:

(i) a mixture of sulfonated polybutenes, aliphatic alkyl quaternary ammonium salts, aminoethanol•epichlorohydrin polycondensates and alkylbenzene sulphonic acids; or (ii) a mixture of chromium salts of alkylsalicylic acids, calcium salt of sulfosuccinic acid and a polymer.

* * * * *